Figure 1:
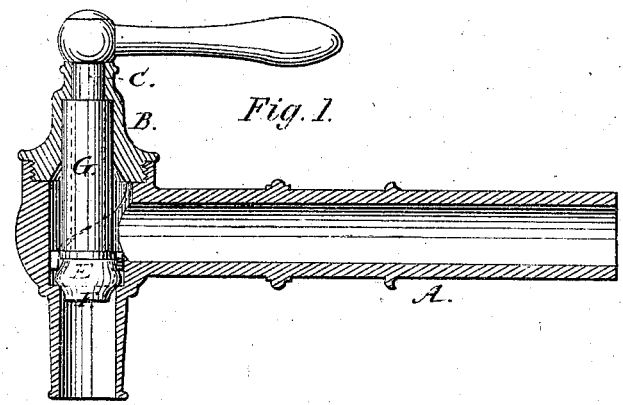

WILLIAM CLEVELAND.

Faucets.

No. 124,546.            Patented March 12, 1872.

Witnesses.

Inventor:

UNITED STATES PATENT OFFICE.

WILLIAM CLEVELAND, OF ORANGE, NEW JERSEY.

IMPROVEMENT IN FAUCETS.

Specification forming part of Letters Patent No. 124,546, dated March 12, 1872.

*To all whom it may concern:*

Be it known that I, WILLIAM CLEVELAND, of Orange, in the county of Essex and State of New Jersey, have originated Improvements in Faucets, of which the following is a specification:

The nature of my invention relates to improvements in the interior of a faucet, whereby the valve is so constructed and arranged that it is self-closing and self-fitting, thereby preventing the usual leakage which most other faucets are liable to after a little use, while thoroughly effectual in its operation. It is remarkably simple in its parts, and is scarcely liable to get out of order. The object of my invention is to make a more perfect faucet than is at the present time in use, at the same time make simplicity an important feature, both of which I have fully accomplished and will describe by referring to the drawing and the following specification forming a part of this application.

Figure 2:
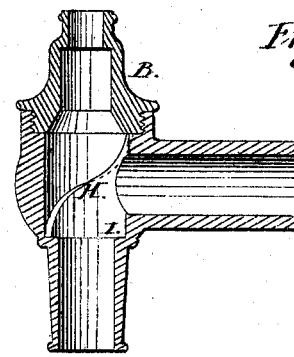
Figure 2:

Figure 1 represents my improved faucet with part of the reservoir cut away to expose the interior, showing the positions of the parts. Fig. 2 represents the valve and stem, showing the rubber spring and packing.

Fig. 1: Letter A, stem of the faucet; B, cap; C, stem of the valve; D, flange; E, button-shaped end, covered with rubber or similar flexible material, forming a valve; F, rubber valve; G, rubber packing, and spring H, inclines to assist the valve in raising; I, valve-seat; J, ears.

Fig. 2: Letter C, stem of the valve; D, flange; E, button-shaped part, covered with rubber to form the valve; F, rubber; G, rubber spring, serving as a packing.

To enable others skilled in the art to make my invention, I will describe its construction.

I form my faucet from any suitable metal by molding, and in such a manner that but little labor is required to complete its parts when compared with others as now manufactured. When made from pewter and cast in molds or dies the threads or screws on the top of the reservoir and the threads on the cap may be cast so nearly perfect that little or no labor is required to finish the same. Rubber tubing, for cheapness and effectiveness, is used for the valve-covering. The hole through the same should be smaller than the button-shaped part of the valve, so that it may remain securely in position after being stretched thereon. Rubber tubing of suitable size and cut in sufficient lengths may be used to surround the valve-stem closely, and in length should be somewhat longer than the space between the flange on the valve-stem and the cap through which the valve-stem passes, so that when the cap is screwed down to its position the rubber is compressed slightly, and thereby a spring is formed that keeps the valve down to its seat or position. The valve-stem, valve, and flange, are, for convenience, cast in one piece. The flange of the same has projections on each side of its diameter, which project beyond the flange about one-eighth of an inch, which are made to rest upon the inclines which are formed on the inside of the reservoir, one opposite to the other. These are formed to assist in elevating the valve when used in combination with springs. The other features of the faucet are similar to those in general use.

I am aware that there are faucets where the valve is surrounded with leather and similar materials, the nature of which is such that hot water and various acids will cause the same to harden or curl in such a manner that they soon leak, and are worthless until repaired, which is generally difficult and troublesome, in consequence of the complication of its parts; while by my improvement any inexperienced person or child may readily repair and put in complete order my faucet. I am aware, also, of faucets where the valve-stem is surrounded with rubber for packing, to prevent leaking around the stem, the outside of which is surrounded by a metallic spring to assist in keeping the valve tightly down, the nature of their construction making it necessary to adopt a plan whereby a greater force is required; hence an unnecessary force to operate the valve.

To operate my faucet it should be put together with the handle inclining toward the left, (when attached to the desired vessel.) The valve is operated by moving the handle from you toward the left. On removing the hand from the handle the valve is immediately closed securely. The simplicity of the valve and the application of the rubber or any similar flexible material to serve as a spring and packing, with the inclines to assist in elevating the valve, is so simple, cheap, effective, and durable, that I am enabled to supply a better article at a less cost than any faucet now manufactured.

What I claim as my invention, and desire to secure by Letters Patent, is—

1. I claim the inclines H, when arranged inside and forming a part of the bowl or chamber of the faucet, to aid in elevating the valve, as described and shown, leaving at diametrical points an open way for the withdrawal of the plug without rotation.

2. I claim the ears J or the projections extending from the flange D of the valve-stem, when made to rest upon the described inclines formed upon the inner periphery of the bowl or chamber of the faucet, as shown and described.

3. I claim the button-shaped part of the valve-stem E, covered with rubber or any similar flexible material without other means to secure the same in position, thus forming a flexible valve.

WM. CLEVELAND. [L. S.]

Witnesses:
JOHN DANE, Jr.,
T. R. RIDDELL.